United States Patent
Shi et al.

(10) Patent No.: US 7,555,035 B2
(45) Date of Patent: Jun. 30, 2009

(54) COMMUNICATION SYSTEM AND METHOD USING A RELAY NODE

(75) Inventors: Hui Shi, Yokosuka (JP); Tetsushi Abe, Yokohama (JP); Takahiro Asai, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 687 days.

(21) Appl. No.: 11/213,883

(22) Filed: Aug. 30, 2005

(65) Prior Publication Data

US 2006/0050655 A1 Mar. 9, 2006

(30) Foreign Application Priority Data

| Aug. 31, 2004 | (JP) | ............................. 2004-252879 |
| Oct. 20, 2004 | (JP) | ............................. 2004-306171 |
| Aug. 30, 2005 | (JP) | ............................. 2005-248824 |

(51) Int. Cl.
H04L 25/52 (2006.01)
H04B 7/14 (2006.01)

(52) U.S. Cl. ..................................... 375/211; 370/315

(58) Field of Classification Search ................ 375/211, 375/213, 219, 267, 295, 299, 316, 349; 370/226, 370/274, 279, 315
See application file for complete search history.

(56) References Cited

U.S. PATENT DOCUMENTS

| 6,058,105 | A | * | 5/2000 | Hochwald et al. ........... 370/310 |
| 6,377,612 | B1 | * | 4/2002 | Baker ......................... 375/141 |
| 7,123,887 | B2 | * | 10/2006 | Kim et al. .................... 455/103 |
| 7,184,703 | B1 | * | 2/2007 | Naden et al. .................. 455/10 |
| 2004/0165684 | A1 | | 8/2004 | Ketchum et al. |
| 2006/0050655 | A1 | | 3/2006 | Shi et al. |
| 2006/0251182 | A1 | * | 11/2006 | Colak ......................... 375/267 |

OTHER PUBLICATIONS

U.S. Appl. No. 11/565,958, filed Dec. 1, 2006, Shi, et al.

(Continued)

*Primary Examiner*—Khanh C Tran
(74) *Attorney, Agent, or Firm*—Oblon, Spivak, McClelland, Maier & Neustadt, P.C.

(57) ABSTRACT

A communication node that relays signals between a source node and a destination node includes (a) a first unitary matrix calculation unit configured to calculate a first unitary matrix based on a first channel between the source node and the relay node, (b) a second unitary matrix calculation unit configured to calculate a second unitary matrix based on a second channel between the relay node and the destination node, (c) a transformation matrix estimation unit configured to estimate a transformation matrix based on a triangular matrix derived from QR decomposition of the first and/or second channel matrix, (d) a relaying signal generator configured to generates a relaying signal by multiplying a received signal by at least one of the first unitary matrix, the second unitary matrix, and the transformation matrix, and (e) a transmission unit configured to transmit the relaying signal to the destination node.

15 Claims, 12 Drawing Sheets

OTHER PUBLICATIONS

Thomas L. Marzetta, "BLAST Training: Estimating Channel Characteristics for High Capacity Space-Time Wireless", Proceedings of the Annual Allerton Conference on Communication, Control and Computing, XP-002365242, Sep. 22, 1999, pp. 958-966.

Ke Liu, et al., "Improved Layered Space-Time Processing in Multiple Antenna Systems", Thirty-Ninth Annual Allerton Conference on Communication, Control, and Computing, XP-002365243, Oct. 4, 2001, pp. 1-10.

Ronald Böhnke, et al., "Reduced Complexity MMSE Detection for BLAST Architectures", GLOBECOM 2003, vol. 4, XP-002365244, Dec. 1, 2003, pp. 2258-2262.

Giuseppe Caire, et al., "On the Achievable Throughput of a Multiantenna Gaussian Broadcast Channel", IEEE Transactions on Information Theory, vol. 49, No. 7, XP-002365245, Jul. 2003, pp. 1691-1706.

Rohit U. Nabar, et al., "Capacity Scaling Laws in MIMO Wireless Networks", Allerton Conference on Communication, Control, and Computing, Oct. 2003, pp. 378-389.

U.S. Appl. No. 11/213,883, filed Aug. 30, 2005, Shi, et al.

U.S. Appl. No. 11/213,886, filed Aug. 30, 2005, Abe, et al.

* cited by examiner

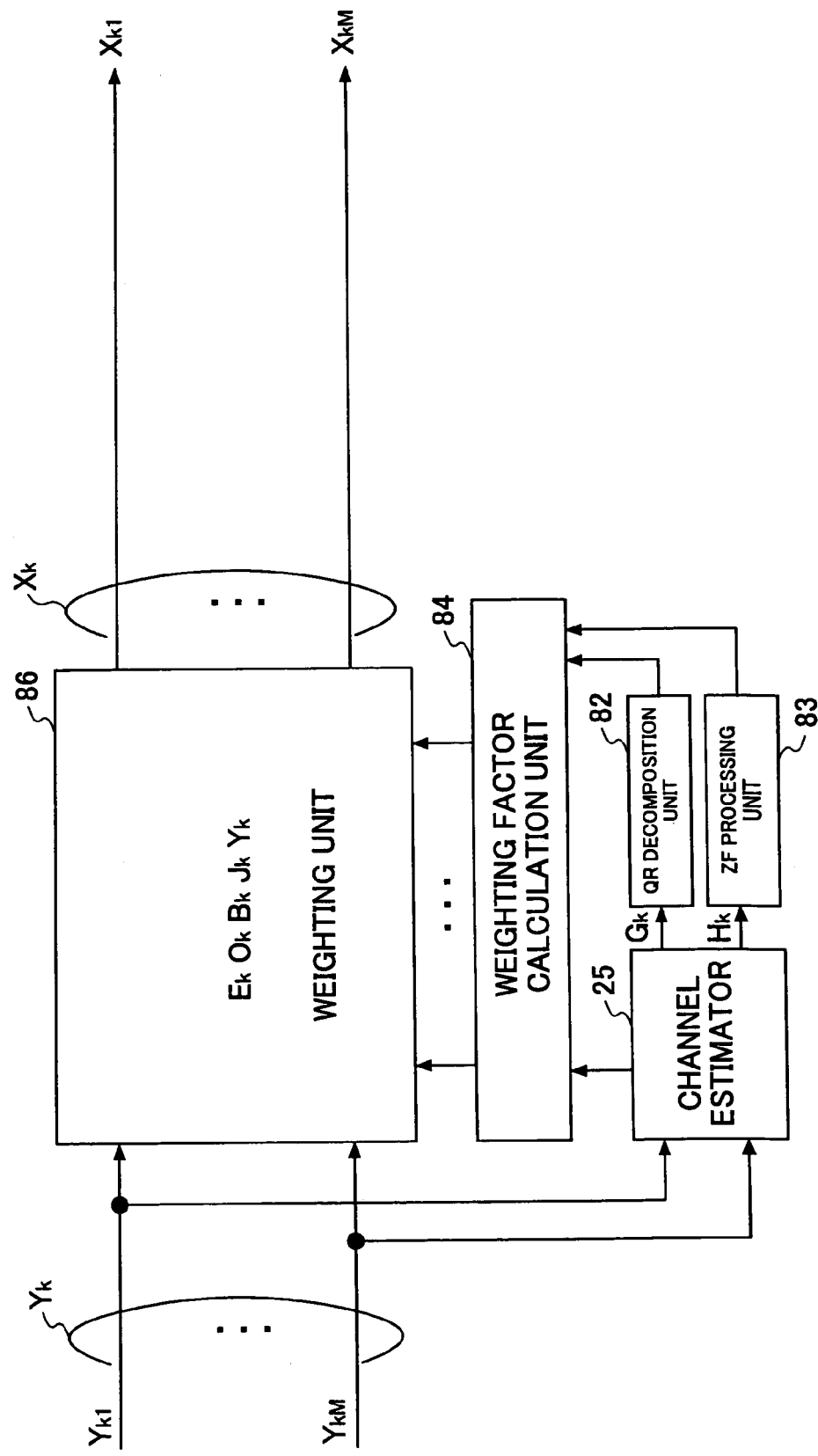

FIG.11

| | RELAY NODE | | DESTINATION NODE |
|---|---|---|---|
| | SIGNAL DETECTION | RELAYING SIGNAL $X_k$ | RECEIVED SIGNAL $Y_R$ |
| PRIOR ART | SIGNAL DETECTION USING ZERO-FORCING | $X_k = E_k W_2 W_1 Y_k$<br>$W_1 = (H^H H)^{-1} H^H$<br>$W_2 = G^H (GG^H)^{-1}$ | $Y_R = E_k S + n$ |
| EMBODIMENT 1 | — | $X_k = E_k O_k A_k Q_k^H Y_k$<br>$H_k = Q_k R_k,\ G = P_k^H O_k^H$ | $Y_R = \sum_{k=1}^{K} E_k T_k S + n$<br>$T_k = P_k A_k R_k$ |
| EMBODIMENT 2 | SIGNAL DETECTION USING QR DECOMPOSITION | $X_k = A_k Q_k^H S$<br>$H_k = Q_k R_k,\ G = P_k O_k$ | $Y_R = \sum_{k=1}^{K} P_k \mathrm{diag}(P_k^H) S + n$ |
| EMBODIMENT 4 | SIGNAL DETECTION USING ZERO-FORCING | $X_k = E_k F_k A_k Q_k^H Y_k$<br>$H_k = Q_k R_k,\ F = G^H (GG^H)^{-1}$<br>$A_k$: diagonal matrix | $Y_R = \sum_{k=1}^{K} E_k A_k R_k S + n$ |
| EMBODIMENT 5 | — | $X_k = O_k^H D_k Q_k^H Y_k$<br>$H_k = Q_k R_k,\ G = P_k O_k$<br>$D_k = \mathrm{diag}(T_k)^*,\ T_k = P_k R_k$ | $Y_R = \sum_{k=1}^{K} T_k D_k S + n$ |
| EMBODIMENT 6 | SIGNAL DETECTION USING QR DECOMPOSITION | $X_k = S$ | $Y_R \rightarrow O^H Y_R$<br>$O^H Y_R = PS + n$<br>$\sum_{k=1}^{K} G_k = OP$ |
| EMBODIMENT 7 | SIGNAL DETECTION ZERO-FORCING OR QR DECOMPOSITION | $X_k = S$ | $Y_R \rightarrow O^H Y_R$<br>$O^H Y_R = PS + n$<br>$\sum_{k=1}^{K} G_k = OP$ |

COMMUNICATION SYSTEM AND METHOD USING A RELAY NODE

BACKGROUND OF THE INVENTION

1. Field of the Invention

The present invention generally relates to wireless communications, and more particularly, to a communication node and a communication method using a multihop scheme and a multiple-input multiple-output (MIMO) scheme.

2. Description of the Related Art

In recent years and continuing, a system based on a combination of a multihop scheme and a MIMO (or multi-antenna) scheme, which system is referred to as a MIMO multihop system, is getting attention. In a multihop scheme, signals are transmitted from a source node to a destination node (or a target node) via one or more relay nodes located between the source and the destination. This system has advantages of expanded coverage by relaying signals, theoretically un-limited signal transmittable areas, and quick establishment of a wireless network. With a MIMO system, multiple transmission antennas and multiple receiving antennas are used to transmit and receive signals in order to increase communication capacity through efficient use of space.

Signal transmission is performed in a MIMO multihop system in the following steps. First, a signal S transmitted from a source node is received at a relay node. The received signal Y at the relay node is expressed as $$Y = HS + n \tag{1}$$

where H denotes a channel matrix between the source and the relay node, S denotes a transmission signal vector, and n denotes noise. Then, the transmission signal S is detected by a zero-forcing (ZF) method. This method is to detect the transmission signal S by calculating a pseudo inverse matrix $W_1 = (H^H H)^{-1} H^H$, and multiplying the received signal by the pseudo inverse matrix $W_1$, together with a normalization coefficient. This process is expressed $$W_1 Y = S + W_1 n. \tag{2}$$

The superscript H in the Pseudo inverse matrix $W_1$ denotes a conjugate transpose.

Norm for an arbitrary matrix A is defined by $$\|A\| = (Tr(E[AA^H]))^{1/2} \tag{3}$$

where symbol $\|\cdot\|$ represents norm, symbol $Tr(\cdot)$ represents the total sum of the diagonal elements of the matrix in the parenthesis, that is, a trace, and symbol $E[\cdot]$ represents averaging the quantities in the bracket. In particular, norm $\|V\|$ for vector quantity $V = (v_1, v_2, \ldots, v_M)^T$ is expressed as $$\|V\| = [|v_1|^2 + |v_2|^2 + \ldots + |v_M|^2]^{1/2} \tag{3'}$$

where superscript T represents transpose. The above-described pseudo inverse matrix corresponds to a Moore-Penrose inverse matrix. In general, the Moore-Penrose inverse matrix B is defined as a m×n matrix that establish ABA=A for a n×m matrix A. In the illustrated example, $HW_1 H = H$ holds with respect to matrix H.

Then, pseudo inverse matrix $W_2 = (G^H G)^{-1} G^H$ is calculated, where G denotes a channel matrix between a relay node and the destination node. Both sides of Equation (2) are multiplied by this pseudo inverse matrix $W_2$ and a normalization coefficient E. This relation is expressed as $$E(W_2 W_1) Y = E W_2 (S + W_1 n) \tag{4}$$

where $E = 1/(\|W_1\| \|W_2\|)*(P_s/(P_s + \sigma_n^2))^{1/2}$ holds, Ps denotes transmit power, and a $\sigma^2$ is variance of noise.

The thus calculated signal is transmitted from a relay node to the destination node. The signal $Y_R$ received at the destination node is expressed as $$Y_R = GEW_2 W_1 Y + n_R \tag{5}$$

where $n_R$ denotes a noise component. Equation (5) can be rewritten as $$Y_R = E(S + W_1 n) + n_R \tag{6}$$

based on the definitions of $W_1$ and $W_2$.

In this manner, the transmission signal S can be acquired promptly at the destination node. Such a MIMO multihop system is described in, for example, Rohit U. Nabar, et al., "Capacity Scaling Laws in MIMO Wireless networks", Allerton Conference on Communication, Control, and Computing, Monticello, Ill., pp. 378-389, Oct. 2003.

From Equation (6), it is understood that the received signal $Y_R$ contains a factor $1/(\|W_1\| \|W_2\|)$ with respect to the transmission signal S. Such factors $\|W_1\|$ and $\|W_2\|$ are indispensable for transmit power control performed at the relay node. However, since $W_1$ and $W_2$ are inverse matrices of channel matrices H and G, respectively, which are subjected to influence of noise amplitude, signal quality is inevitably degraded. In addition, Equation (6) contains the noise component "n", which is introduced during propagation from the source to the relay node in such a manner that greatly affects the received signal. Accordingly, as the number of hops increases, signal degradation due to the noise become conspicuous.

SUMMARY OF THE INVENTION

The present invention was conceived to overcome the above-described problems, and it is an object of the invention to provide a communication system, a communication node, and a communication method that can prevent degradation of received signal quality at a destination node more efficiently, as compared to conventional techniques, in signal transmission from a source node to the destination.

In one aspect of the invention, a communication system in which a signal transmitted from a source node is sent to a destination node via a relay node is provided. In this system, the relay node includes a) a QR decomposition unit configured to perform QR decomposition on a first channel matrix between the source node and the relay node and/or a second channel matrix between the relay node and the destination node;

b) a transformation matrix calculation unit configured to calculate one or more transformation matrices based on the QR of at least one of the first and second channel matrices;

c) a relaying signal generator configured to generate a relaying signal by multiplying a received signal by a prescribed signal comprised of at least one of the transformation matrices; and d) a transmission unit configured to transmit the relaying signal to the destination node.

The destination node receives the relaying signal as a received signal and detects a desired signal from the received signal.

With this system, degradation of the received signal quality at the destination node can be prevented more efficiently, as compared with the conventional techniques, in signal transmission from the source node to the destination node using a MIMO multihop scheme.

In another aspect of the invention, a relay node used to relay a signal from a source node to a destination node in a wireless communication system is provided. In a preferred embodiment, the relay node includes:

a) a first unitary matrix calculation unit configured to calculate a first unitary matrix based on a first channel matrix H between the source node and the relay node;

b) a second unitary matrix calculation unit configured to calculate a second unitary matrix based on a second channel matrix G between the relay node and the destination node;

c) a transformation matrix calculation unit configured to calculate a transformation matrix A based on a triangular matrix derived from at least one of the first and second channel matrices through QR decomposition;

d) a relaying signal generator configured to generates a relaying signal by multiplying a received signal by at least one of the first unitary matrix, the second unitary matrix, and the transformation matrix; and e) a transmission unit configured to transmit the relaying signal to the destination node.

The first unitary matrix is determined by decomposing the first channel matrix H between the source node and the relay node into the form of a product containing a first triangular matrix R1. The second unitary matrix is determined by decomposing the second channel matrix between the relay node and the destination node into the form of a product containing a second triangular matrix R2. An element at the i-th line and the j-th column of the transformation matrix A is zero if i+j does not satisfy a prescribed value.

With this arrangement, the relaying signal is produced using at least one of the unitary matrices and the transformation matrix, and therefore, multihop transmission can be realized while preventing signal loss and degradation of signal quality.

In still another aspect of the invention, a relay node for relaying signals between a source node and a destination node comprises:

a) a first matrix calculation unit configured to calculate a unitary matrix based on a first channel matrix between the destination node and the relay node;

b) a second matrix calculation unit configured to calculate a Moore-Penrose inverse matrix based on a second channel matrix between the source node and the relay node matrix;

c) a transformation matrix calculation unit configured to calculate a transformation matrix on the basis of a triangular matrix derived from QR decomposition of the second channel matrix;

d) a relaying signal generator configured to generate a relaying signal by multiplying a received signal by the unitary matrix, the Moore-Penrose inverse matrix, and the transformation matrix; and e) a transmission unit configured to transmit the relaying signal With this arrangement, noise enhancement at the relay node can be reduced regardless of the number of relay nodes between the source node and the destination node.

In still yet another aspect of the invention, a relay node for relaying a transmission signal transmitted from a source node to a destination node includes:

a) a first matrix calculation unit configured to calculate a unitary matrix based on a first channel matrix between the source node and the relay node;

b) a second matrix calculation unit configured to calculate a Moore-Penrose inverse matrix based on a second channel matrix between the destination node and the relay node;

c) a transformation matrix calculation unit configured to calculate a transformation matrix on the basis of a triangular matrix derived from QR decomposition of the second matrix;

d) a relaying signal generator configured to generate a relaying signal by multiplying a received signal by the unitary matrix, the Moore-Penrose inverse matrix, and the transformation matrix; and e) a transmission unit configured to transmit the relaying signal.

BRIEF DESCRIPTION OF THE DRAWINGS

Other objects, features, and advantages of the invention become more apparent from the following detailed description when read in conjunction with the accompanying drawings, in which

FIG. 10A is a functional block diagram of the relay signal generator according to yet another embodiment of the invention;

FIG. 11 is a table showing a comparison between a conventional technique and embodiments of the present invention.

DETAILED DESCRIPTION OF THE PREFERRED EMBODIMENT

The present invention is described in detail below in conjunction with the attached drawings. In the specification and claims, "unitary matrix" is not necessarily a normal matrix, and the number of lines and the number of columns may differ from each other. A "unitary matrix" is a matrix in which the respective lines (or the columns) are orthogonal to each other. Accordingly, as well as including a normal matrix that diagonalizes a square matrix A, the "unitary matrix" includes a N×M non-square matrix for diagonalizing a M×N non-square matrix B.

Embodiment 1

Figure 1:
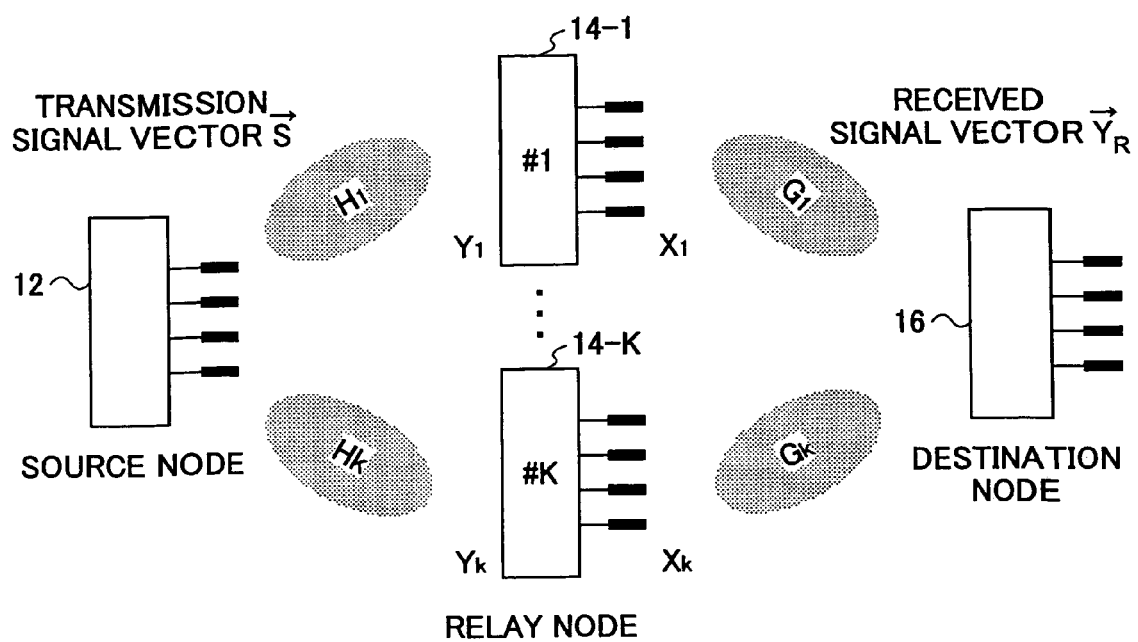
FIG. 1 is a schematic diagram illustrating a communication system employing a MIMO scheme and a multihop scheme.

FIG. 1 is a schematic diagram illustrating the overall structure of a communication system according to an embodiment of the invention. The communication system employs a multihop scheme and a multiple-input multiple-output (MIMO) scheme. The communication system includes a source node 12, a destination node 16, and K (K≧1) relay nodes 14-1 through 14-K. The k-th relay node is denoted as 14-k (1≦k≦K). Communications between the source node 12 and the relay node 14-k and communication between the relay node 14-k and the destination node 16 are performed using a MIMO scheme. Signal transmission from the source node 12 to the destination node 16 is performed by a multihop scheme. In this embodiment, each of the K relay nodes can relay a signal from the source node 12 to the destination node 16 by one hop, for simplification purpose. However, the number of hops may be increased.

The source node 12 transmits mutually distinguishable signals from multiple antennas (M antennas, for example). Each of the M antennas transmits the associated signal independently under the MIMO scheme. The signals transmitted from M antennas define a transmission signal vector S, each signal being a vector component.

Each of K relay nodes 14 receives the signal from the source node 12, performs prescribed signal processing on the received signal to generate a relaying signal, and transmits the relaying signal to the destination node 16. The K relay nodes 14 have the same structure and functions, which structure and functions are described below.

The destination node 16 receives the relaying signals from the K relay nodes 14, and detects the contents of the transmission signal vector S transmitted from the source node 12.

Figure 2:
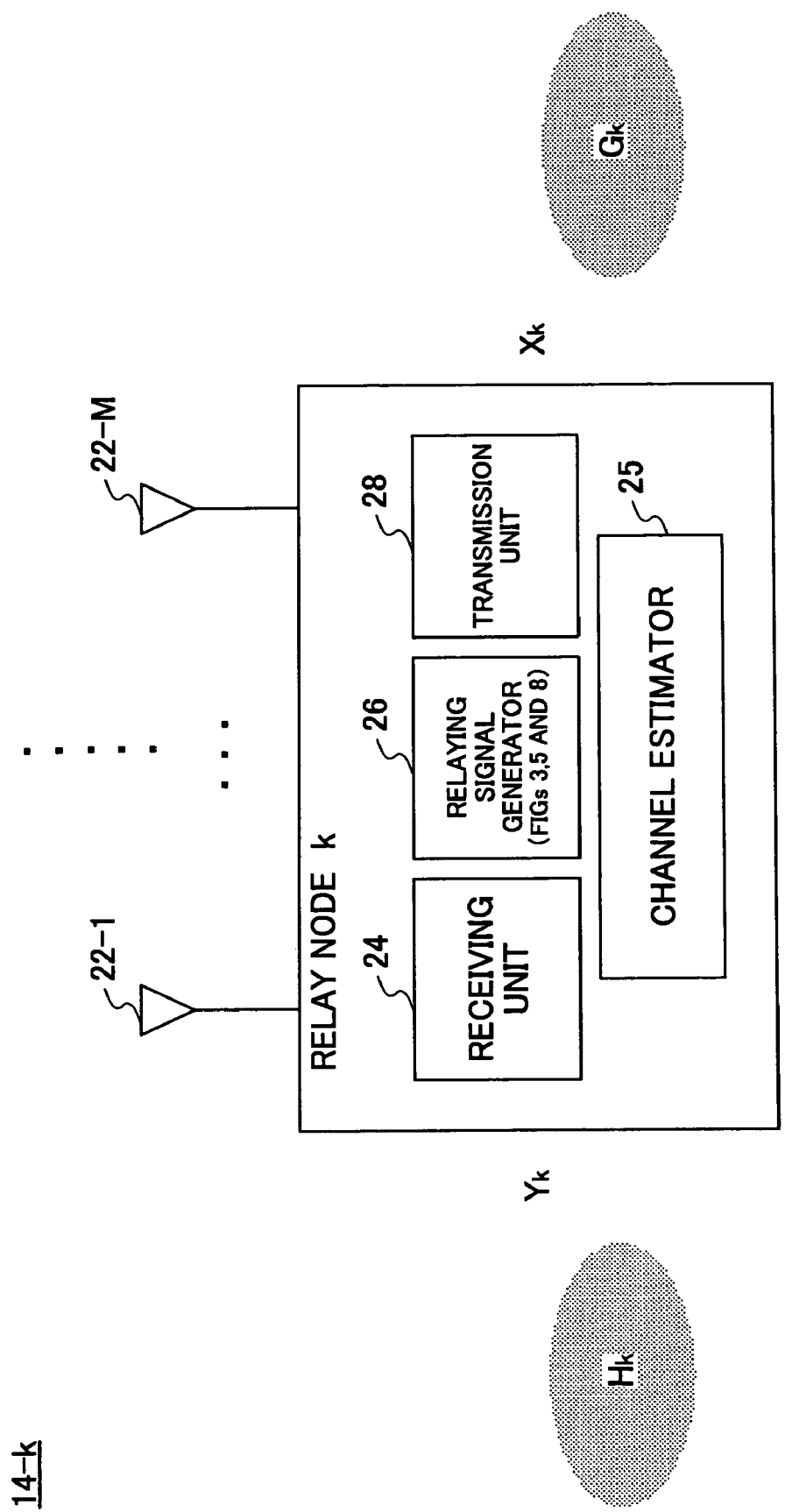
FIG. 2 is a schematic block diagram of a relay node.

FIG. 2 is a block diagram of the relay node 14-k. The relay node 14-k has multiple antennas 22-1 through 22-M, a receiving unit 24, a channel estimator 25, a relaying signal generator 26, and a transmission unit 28. Since the source node 12 and the destination node 16 can also be relay nodes, this structure applies not only to the relay node 14, but also the source node 12 and the destination node 16.

In this embodiment, it is assumed for the purpose of simplification that each of the source node 12, the relay nodes 14-1 through 14-K, and the destination node 16 has M antennas for transmitting and receiving signal. However, these nodes may have different numbers of antennas, and in addition, different numbers of antennas may be used in transmission and receipt of signals.

The receiving unit 24 performs appropriate signal processing with respect to the signals $Y_k$ received at the M antennas 22-1 through 22-M. Such signal processing includes receiving front-end processes, such as frequency conversion and band limitation, and weighting for each antenna. The received signal $Y_k$ is expressed as a vector consisting of M components corresponding to the M antennas. The receiving unit 24 also analyzes the header of the received signal $Y_k$ to determine the destination node, to which node the signal is to be transmitted. If the signal cannot reach the destination node by one hop, the relay node 14-k transmits the signal to another relay node.

The channel estimator 25 estimates a channel matrix $H_k$ between the source node 12 and the relay node 14-k. By receiving individual pilot channels transmitted from the source node 12, the matrix elements of the channel matrix $H_k$ can be derived. Similarly, the channel estimator 25 estimates a channel matrix $G_k$ between the relay node 14-k and destination node 16. The channel estimator 25 also estimates the channel condition as necessary. The condition of the wireless channel can be estimated by measuring, for example, the SNR or the SIR, based on the received signal. The level of the channel condition can be used in the embodiments described below.

The relaying signal generator 26 generates a relaying signal $X_k$ based on the received signal $Y_k$ and the channel estimation result. The relaying signal $X_k$ is a vector consisting of M components corresponding to the M antennas. The relaying signal generator 26 will be described in more detail below.

The transmission unit 28 performs signal processing to transmit the relaying signal $X_k$ via the multiple antennas to the destination node 16. The signal processing includes frequency conversion, band limitation, power amplification, and weighting for each antenna.

Figure 3:
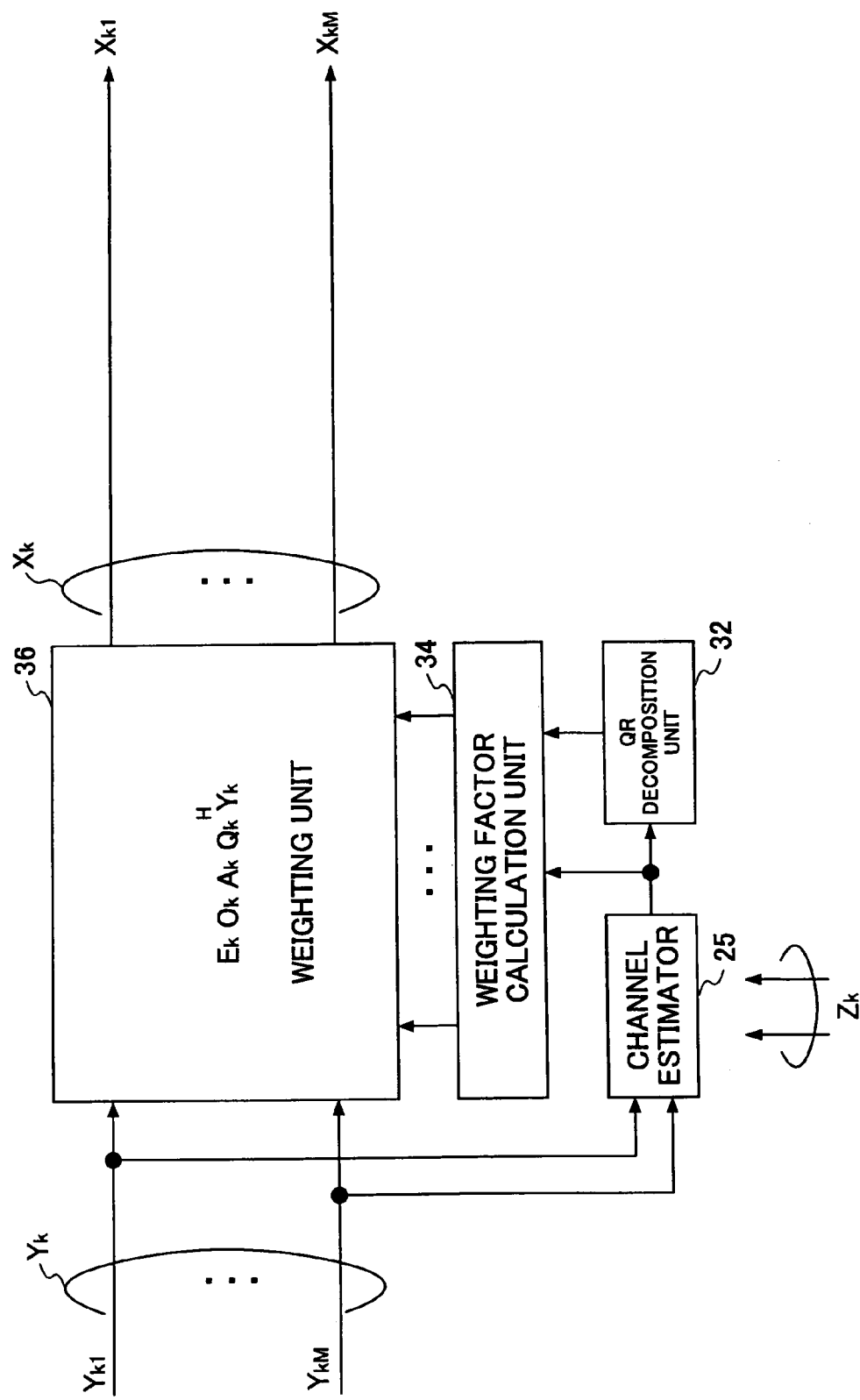
FIG. 3 is a functional block diagram of a relaying signal generator according to an embodiment of the invention.

FIG. 3 is a functional block diagram of the relaying signal generator 26. The relaying signal generator 26 has a QR decomposition unit 32, a weighting factor calculation unit 34, and a weighting unit 36.

Upon receiving information about the channel matrices $H_k$ and $G_k$ from the channel estimator 25, the QR decomposition unit 32 breaks down the channel matrix $H_k$ into the form of a product of a unitary matrix $Q_k$ and a triangular matrix $R_k$. As a result, the unitary matrix $Q_k$ and the triangular matrix $R_k$ satisfying Equation (7) are determined.

$$H_k = Q_k R_k \quad (7)$$

It should be noted that the first through the (i-1)th line elements of the i-th line in the triangular matrix $R_k$ are zero (2≦i≦M), as expressed by Equation (8).

$$R_k = \begin{pmatrix} r_{11} & \cdots & r_{1M} \\ & \ddots & \\ 0 & & r_{MM} \end{pmatrix} \quad (8)$$

The QR decomposition unit 32 also breaks down the channel matrix $G_k$ into the form of a product of a triangular matrix $P_k^H$ and a unitary matrix $O_k^H$ represented by Equation (9), where the superscript H indicates conjugate transpose.

$$G_k = P_k^H O_k^H \quad (9)$$

It should be noted that the first through the (i-1)th line elements of the i-th line in the triangular matrix $P_k$ are zero (2≦i≦M), as expressed by Equation (10).

$$P_k = \begin{pmatrix} p_{11} & \cdots & p_{1M} \\ & \ddots & \\ 0 & & p_{MM} \end{pmatrix} \quad (10)$$

Since the matrix $P_k$ is a upper triangular matrix, the matrix $P_k^H$ is a lower triangular matrix.

Based on the channel matrices Hk and Gk, as well as on the QR decomposition formulae, the weighting factor calculation unit 34 calculates weighting factors for the received signal $Y_k$. The details of the calculation of the weighting factors are described below in conjunction with the operation of the communication system.

The weighting unit 36 performs a prescribed matrix operation to convert the received signal $Y_k$ to a relaying signal $X_k$.

Figure 4:
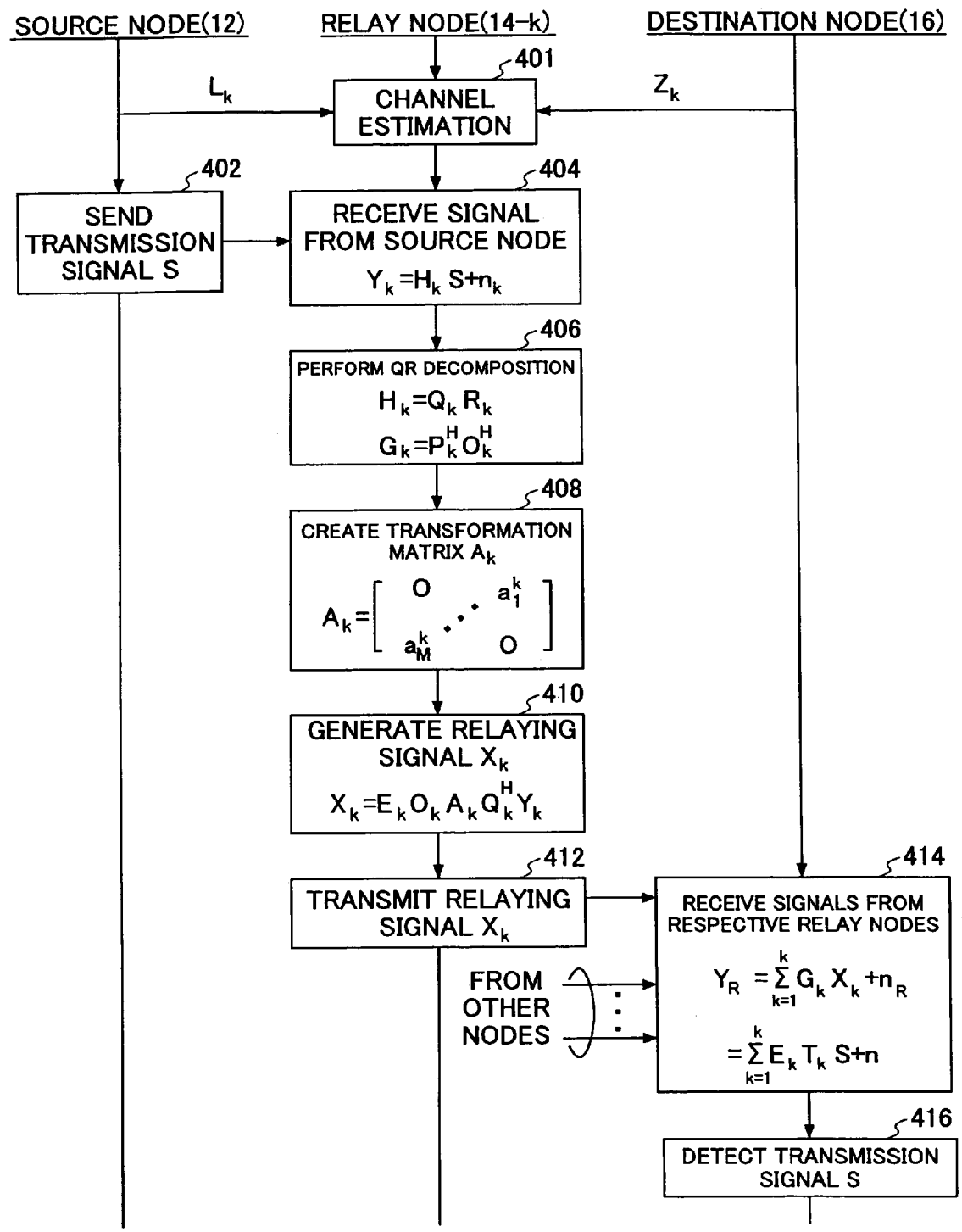
FIG. 4 is a flowchart illustrating operations of the communication system according to an embodiment of the invention.

FIG. 4 is a flowchart showing the operations of the communication system according to the embodiment of the invention. In this communication system, the source node 12 transmits a transmission signal vector S consisting of a set of M signal components from the M antennas to surrounding relay nodes. The relay nodes located within a prescribed range from the source node 12 receive the signal S. This range may be called a 1-hop range. For convenience of explanation, it is assumed that K relay nodes receive the transmission signal S and perform similar signal processing to relay the signal to the destination node. Although only the k-th relay node ($1 \leq k \leq K$) is illustrated in FIG. 4, the other relay nodes perform similar operations.

First, the source node 12 and the destination node 16 transmit pilot signals $L_k$ and $Z_k$, respectively, which pilot signals are received at the relay node 14-k. In step 401, the relay node 14-k performs channel estimation based on the pilot signals $L_k$ and $Z_k$ to estimate a channel matrix H between the source node 12 and the relay node 14-k and a channel matrix G between the relay node 14-k and the destination node 16.

In step 402, the source node 12 transmits a transmission signal represented as a signal vector S consisting of a set of M components from M antennas to surrounding relay nodes.

In step 404, the relay node 14-k receives the signal from the source node 12. The received signal is expressed as $$Y_k = H_k S + n_k \tag{11}$$

where $H_k$ is a channel matrix between the source node 12 and the relay node k-th, as is described above, and $n_k$ denotes the noise component.

In step 406, the relay node 14-k performs QR decomposition for the channel matrices $H_k$ and $G_k$ at the QR decomposition unit 32 (see FIG. 3). In this step, the channel matrix $H_k$ is broken down into the form of a product of a unitary matrix $Q_k$ and a triangular matrix $R_k$ ($H_k = Q_k R_k$), and the channel matrix $G_k$ is broken down into the form of a product of a triangular matrix $P_k^H$ and a unitary matrix $O_k^H$ ($G_k = P_k^H O_k^H$).

In step 408, a transformation matrix $A_k$ is calculated at the weighting factor calculation unit 34 (FIG. 3), based on the triangular matrices $P_k$ and $R_k$. The matrix element in the i-th line and j-th column of the transformation matrix $A_k$ is zero if i+j is not M+1 ($i+j \neq M+1$). In this case, the transformation matrix $A_k$ is expressed by Equation (12).

$$A_k = \begin{pmatrix} 0 & & a_1^k \\ & \ddots & \\ a_M^k & & 0 \end{pmatrix} \tag{12}$$

In other words, the transformation matrix A is a matrix that becomes a diagonal matrix when the lines and the columns are arranged in reverse order (reversed diagonal matrix). If i+j equals M+1, the matrix element $(A_k)_{i, M-i+1} = a_i^k$ is expressed as $$a_i^k = \frac{(P_k^H \Pi R_k)_{i,M-i+1}^H}{\|(P_k^H \Pi R_k)_{i,M-i+1}^H\|} \tag{13}$$

where matrix $\Pi$ represents a commutative matrix, which is expressed by Equation (14).

$$\Pi = \begin{pmatrix} 0 & & 1 \\ & \ddots & \\ 1 & & 0 \end{pmatrix} \tag{14}$$

In step 410, a relaying signal $X_k$ is generated, which relaying signal is expressed by Equation (15)

$$X_k = E_k O_k A_k Q_k^H Y_k \tag{15}$$

The coefficient Ek is a scalar quantity defined by $$E_k = \sqrt{\frac{PM}{P[tr\{(P_k^H A_k R_k)(P_k^H A_k R_k)^H\}] + MN\sigma^2}} \tag{16}$$

where P denotes the total transmit power at the source node 12, and $\sigma^2$ denotes a noise level.

In step 412, the relay signal $X_k$ is transmitted to the destination node 16.

In step 414, signals from all the relay nodes that relay the signal from the source node 12 are received at the destination node 16. The signal $Y_R$ received at the destination node 16 is expressed as $$\begin{aligned} Y_R &= \sum_{k=1}^{K} G_k X_k + n_R \\ &= \sum_{k=1}^{K} E_k T_k S + n \end{aligned} \tag{17}$$

where $n_R$ and n represent noise components. From Equations (7), (9) and (11), the following relation holds.

$$\begin{aligned} Q_k^H Y_k &= Q_k^H (H_k S + n_k) \\ &= Q_k^H (Q_k R_k S + n_k) \\ &= R_k S + Q_k^H n_k \end{aligned}$$

In addition, from the above-described relation and Equations (9) and (16), the following relation holds.

$$\begin{aligned} G_k X_k &= P_k^H O_k^H \cdot E_k O_k A_k Q_k^H Y_k \\ &= E_k' P_k^H A_k Q_k^H Y_k \\ &= E_k P_k^H A_k R_k S + E_k P_k^H A_k Q_k^H n_k \\ &= E_k T_k S + \text{(noise component)} \end{aligned}$$

where $T_k = P_k^H A_k R_k$.

Matrix Tk can be expressed as Equation (18), based on Equations (8), (10) and (16).

$$\begin{aligned} T_k &= P_k^H A_k R_k \\ &= \begin{bmatrix} 0 & & & a_1^k p_{22}^* r_{mm} \\ & a_2^k p_{22}^* r_{m-1m-1} & & \\ & & \ddots & \\ a_m^k p_{mm}^* r_{11} & & & \end{bmatrix} \\ &= \begin{bmatrix} 0 & & & |p_{11}||r_{mm}| \\ & |p_{22}||r_{m-1m-1}| & & \\ & & \ddots & \\ |p_{mm}||r_{11}| & & & \end{bmatrix} \end{aligned} \tag{18}$$

Taking Equation (13) into account, it is understood that the non-zero matrix element $a_i^k$ equals $p_{ii}$ $(r_{M-i+1\ M-i+1})*/|p_{ii}(r_{M-i+1\ M-i+1})*|$, where the asterisk represents complex conjugate. Accordingly, $Y_k S$ becomes a matrix having the first through M-th elements expressed by Equation (19).

$$Y_k S = \begin{pmatrix} 0 & & t_{1,M}^{(k)} \\ & \ddots & \vdots \\ t_{M,1}^{(k)} & \cdots & t_{M,M}^{(k)} \end{pmatrix} \begin{pmatrix} S_1 \\ \vdots \\ S_M \end{pmatrix} \quad (19)$$

$$= \begin{pmatrix} |P_{1,1}||r_{M,M}|S_M \\ \vdots \\ |P_{M,M}||r_{1,1}|S_1 + \cdots + t_{M,M}^{(k)} S_M \end{pmatrix}$$

In step 416, transmission signal S is detected based on Equations (17) and (18). The signal detection is carried out using a successive interference canceling method (for canceling the non-diagonal components of $T_k$ successively). Assuming that the successive canceling method is performed in an ideal manner, the equivalent signal-to-noise ratio (λm) of each transmission stream is calculated by Equation (20-1), based on the channel estimation result at the destination node 16.

$$\lambda_m = \frac{P}{M} \frac{\left(\sum_{k=1}^{k}(E_k P_k^H A_k R_k)_{m,M-m+1}\right)^2}{\sigma_r^2 \sum_{k=1}^{k} E_k \|(P_k^H A_k)_m\|^2 + \sigma_d^2} \quad (20\text{-}1)$$

where $\sigma_r^2$ and $\sigma_d^2$ are variances of noise components $n_k$ and $n_R$, respectively, and P denotes the total transmit power of the source node 12. From Equation (20-1), the communication capacity C between the source node 12 and the destination node 16 is expressed by Equation (20-2) when the rates of the streams $S_1, \ldots, S_M$ are independently controlled.

$$C = \sum_{m=1}^{M} \frac{1}{2}\log_2(1+\lambda_m) \quad (20\text{-}2)$$

Information about the rate of each stream can be reported to the source node 12 by feeding the information from the destination node back to the source node 12. The power levels of the respective streams can also be controlled independently.

As expressed in Equation (19), the non-diagonal components of $T_k$ are cancelled, and each of the signal components $S_1$ through $S_M$ of the signal vector acquired from the relay nodes 14 is multiplied by a positive real number. These matrix elements are combined at the destination node. Because the coefficients used in signal combining do not contain imaginary components (phase components), there is little need to cancel components during the signal combination, and accordingly, in-phase signal combination can be achieved at the maximum ratio. In other words, the relaying signals from the respective relay nodes 14 can be combined coherently in phase.

Because the scalar quantity $E_k$ and other coefficients are calculated based mainly on transformation of the unitary matrices, adverse influence of noise increase can be reduced, as compared with the conventional techniques. This arrangement is advantageous from the viewpoint of reduction of signal loss. Thus, degradation of signal quality, which is the technical problem in the prior art, can be solved.

Embodiment 2

Figure 5:
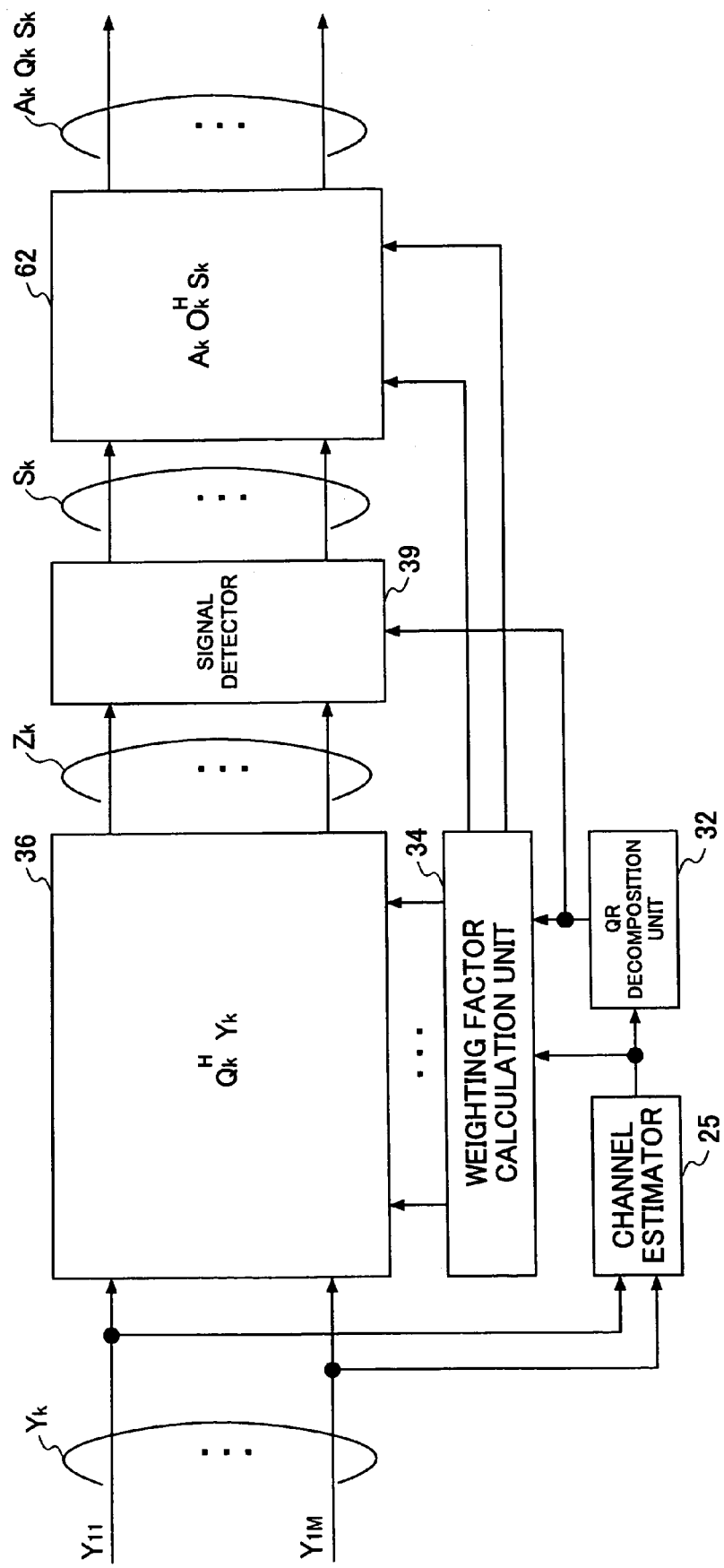
FIG. 5 is a functional block diagram of a relaying signal generator according to the second embodiment of the invention.

FIG. 5 is a functional block diagram of the relaying signal generator 26 used in the relay node 14 according to the second embodiment of the invention. The relaying signal generator 26 includes a QR decomposition unit 32, a weighting factor calculation unit 34, a first weighting unit 36, a signal detector 39, and a second weighting unit 62. In the second embodiment, the destination node 16 may have the structure and functions shown in FIG. 5, or alternatively, it may have the structure and functions shown in FIG. 3.

Upon receiving information about the channel matrices $H_k$ and $G_k$ from the channel estimator 25, the QR decomposition unit 32 breaks down the channel matrix $H_k$ in a form of product of a unitary matrix $Q_k$ and a triangular matrix $R_k$ ($H_k=Q_k R_k$). The the QR decomposition unit 32 also breaks down the channel matrix $G_k$ into the form of a product of a triangular matrix $P_k^H$ and a unitary matrix $O_k^H$ ($G_k=P_k^H O_k^H$).

The weighting factor calculation unit 34 calculates weighting factors for the received signal $Y_k$ based on the channel matrices $H_k$ and $G_k$, as well as on the information about the QR decomposition formulae.

The first weighting unit 36 multiples the received signal $Y_k$ by the weighting factor $Q_k^H$ estimated by the weighting factor calculation unit 34 in order to extract each component of the received signal.

The signal detector 39 detects the transmission signal $S_k=(S_{k1}, \ldots, S_{kM})$ transmitted from the source node 12, based on the weighted received signal output from the weighting unit 36 and information about the triangular matrix.

The second weighting unit 62 multiplies the detected transmission signal Sk by a weighting factor $A_k O_k^H$ calculated by the weighting factor calculation unit 34, and outputs each component of the relaying signal $A_k O_k^H S_k$.

Figure 6:
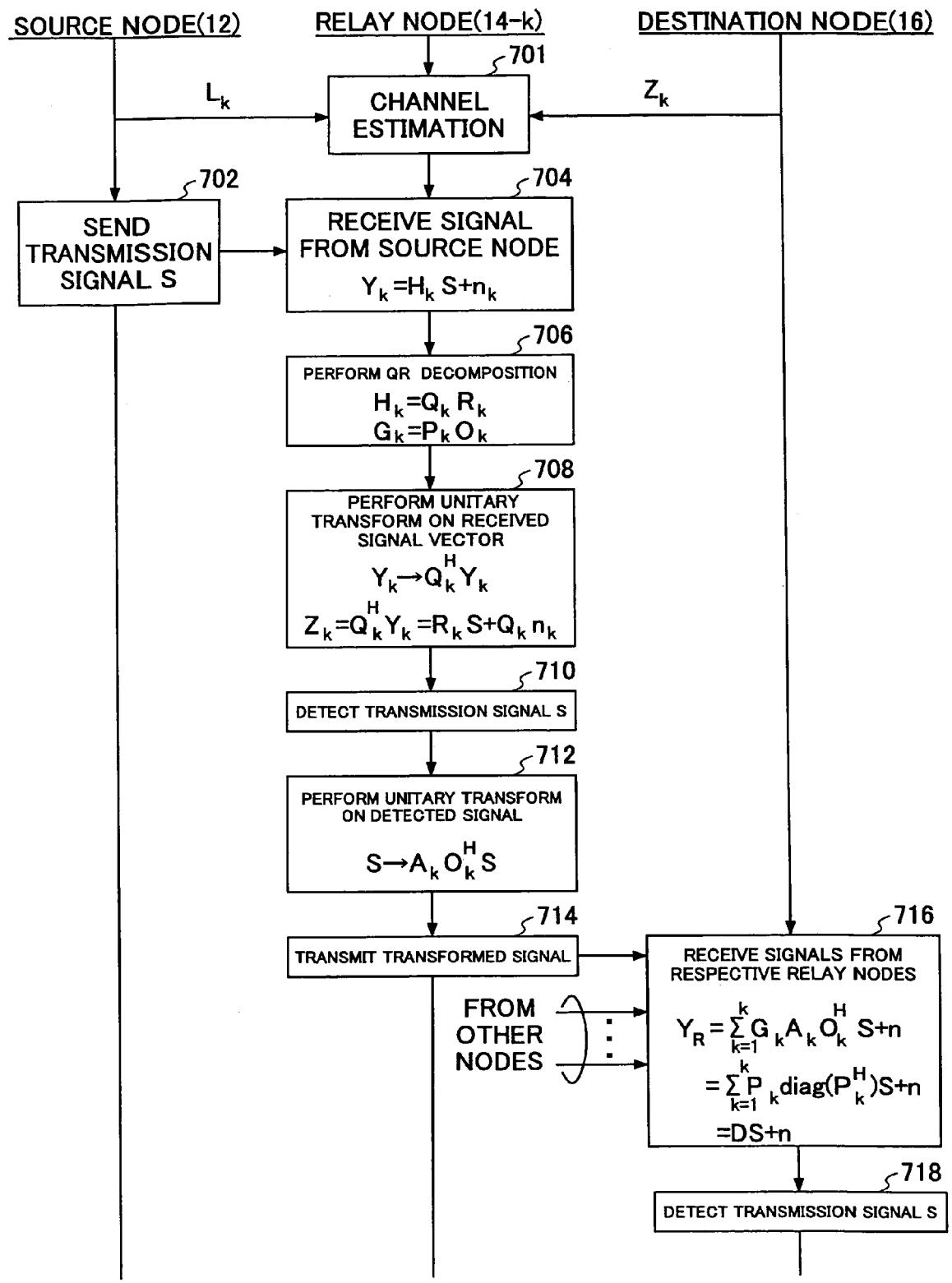
FIG. 6 is a flowchart illustrating operations of the communication system using the relaying signal generator shown in FIG. 5.

FIG. 6 is a flow chart showing the operations of the communication system according to the second embodiment of the invention.

First, the source node 12 and the destination node 16 transmit pilot signals $L_k$ and $Z_k$, respectively, which pilot signals are received at the relay node 14-k. In step 701, the relay node 14-k performs channel estimation based on the pilot signals $L_k$ and $Z_k$ to estimate a channel matrix H between the source node 12 and the relay node 14-k and a channel matrix G between the relay node 14-k and the destination node 16.

In step 702, the source node 12 transmits a transmission signal represented as a signal vector S consisting of a set of M components from M antennas to surrounding relay nodes.

In step 704, the relay node 14-k receives the signal from the source node 12. The received signal is expressed as $$Y_k = H_k S + n_k.$$

In step 706, QR decomposition for the channel matrices $H_k$ and $G_k$ is performed. The channel matrix $H_k$ is broken down into the form of a product of a unitary matrix $Q_k$ and a triangular matrix $R_k$ ($H_k=Q_k R_k$), and the channel matrix $G_k$ is broken down into the form of a product of a triangular matrix $p_k^H$ and a unitary matrix $O_k^H$ ($G_k=P_k^H O_k^H$).

In step 708, unitary transformation is carried out by multiplying the received signal $Y_k$ by the unitary matrix $Q^H$. The unitary-transformed received signal $Z_k$ is expressed as $$Z_k = Q_k^H Y_k$$

$$= R_k S + Q_k^H n_k.$$

Since matrix $R_k$ is an upper triangular matrix, the following relation holds if the noise is omitted.

$$Z_{k1} = r_{11}S_1 + r_{12}S_2 + \ldots + r_{1M}S_M$$

$$Z_{k2} = r_{22}S_{12} + \ldots r_{2M}S_M$$

...

$$Z_{kM-1} = r_{M-1\ M-1}S_{M-1} + r_{M-1\ M}S_M$$

$$Z_{kM} = r_{MM}S_M$$

In step 710, transmission signal S is detected from the unitary-transformed received signal. First, focusing on the M-th received signal component $Z_{km}$, transmission signal component $S_M$ is detected based on known $z_{kM}$ and $r_{MM}$. Then, focusing on the (M−1)th received signal component $Z_{kM-1}$, transmission signal component $S_{M-1}$ is detected based on known $r_{M-1\ M-1}$, $r_{MM}$, and $S_M$. In a similar manner, the transmission signal components are successively detected.

In step 712, further transformation is performed by multiplying the detected transmission signal $S_k$ by $A_k O_k^H$, where matrix Ak is a diagonal matrix expressed as $$A_k = \text{diag}(P_k^H).$$

In step 714, the transformed signal $O_k^H S_k$ is transmitted as a relaying signal to the destination node 16.

In step 716, the signals relayed from all the relevant relay nodes 14 are received at the destination node 16. The received signal $Y_R$ is expressed as $$Y_R = \sum_{k=1}^{K} G_k A_k O_k^H S + n \quad (21)$$

$$= \sum_{k=1}^{K} P_k \text{diag}(P_k^H) S + n$$

$$= DS + n$$

where n denotes a noise component. Equation (21) makes use of the fact that the channel matrix Gk can be broken down into the form of $G_k = P_k O_k$. Because $P_k$ is a triangular matrix, the sum (or combination) of the K matrices $P_k$ also becomes a triangular matrix. The combination result is expressed as matrix D (with elements dij). Information about the triangular matrix Pk and the unitary matrix Ok may be determined by performing QR decomposition at the destination node 16, or alternatively, collected from each of the relay nodes 14. Equation (21) is developed into the following form if the noise component is omitted.

$$Y_{R1} = d_{11}S_1 + d_{12}S_2 + \ldots + d_{1M}S_M$$

$$Y_{R2} = d_{22}S_2 + \ldots + d_{2M}S_M$$

...

$$Y_{RM-1} = d_{M-1\ M-1}S_{M-1} + d_{M-1\ M}S_M$$

$$Y_{RM} = d_{MM}S_M$$

In step 718, transmission signal S is detected at the relay node 16. First, focusing on the M-th received signal component $Y_{RM}$, transmission signal component $S_M$ is detected based on known $z_{RM}$ and $d_{MM}$. Then, focusing on the (M−1)th received signal component $Y_{RM-1}$, transmission signal component $S_{M-1}$, is detected based on known $d_{M-1\ M-1}$, $d_{M-1\ M}$, and $S_M$. In a similar manner, the transmission signal components are successively detected.

In the second embodiment, the destination node 16 does not have to perform unitary transformation in step 716 in FIG. 6.

Embodiment 3

Figure 7A:
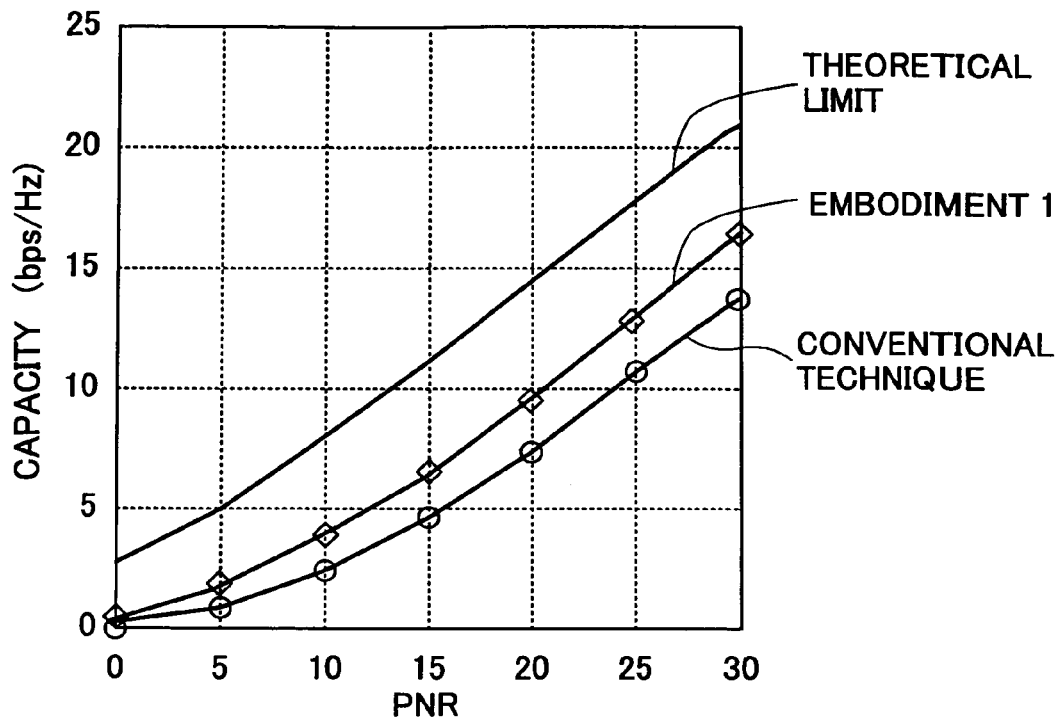
FIG. 7A and FIG. 7B are graphs showing simulation results of the present invention.
Figure 7B:
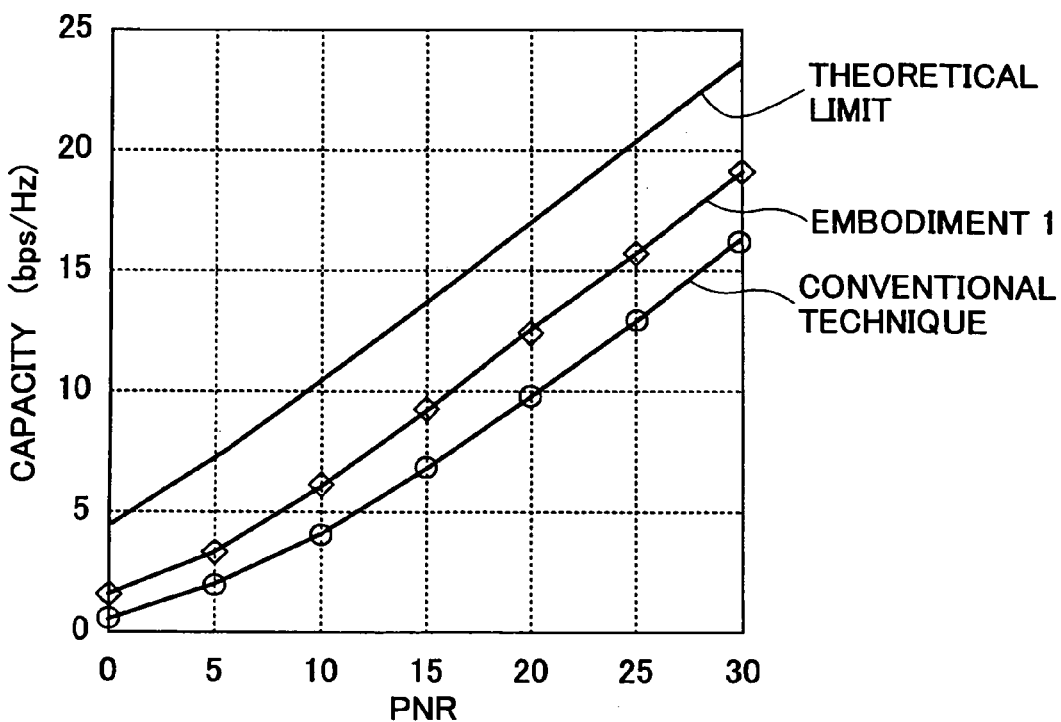

FIG. 7A and FIG. 7B are graphs showing simulation results of signal transmission according to an embodiment of the invention. The horizontal axis represents power to noise ratio (PNR), and the vertical axis represents capacity. In FIG. 7A, the number of transmission antennas and the number of receiving antennas are each four, and two relay nodes (K=2) are located between the source node and the destination node within a one-hop communication range. The curve of theoretical limit indicates the theoretical limit of the capacity as a function of PNR, and the curve of the prior art indicates the capacity when relaying signals using the zero-forcing method. The curve of Embodiment 1 is obtained by implementing the method of the first embodiment. In FIG. 7B, the number of transmission antennas and the number of receiving antennas are each four, and four relay nodes (K=4) are located between the source node and the destination node within a one-hop communication range. From the graphs of FIG. 7A and FIG. 7B, it is understood that as the transmit power increases, the system capacity increases, and that the method of Embodiment 1 is superior to the conventional method in achieving sufficient capacity.

Embodiment 4

Figure 8:
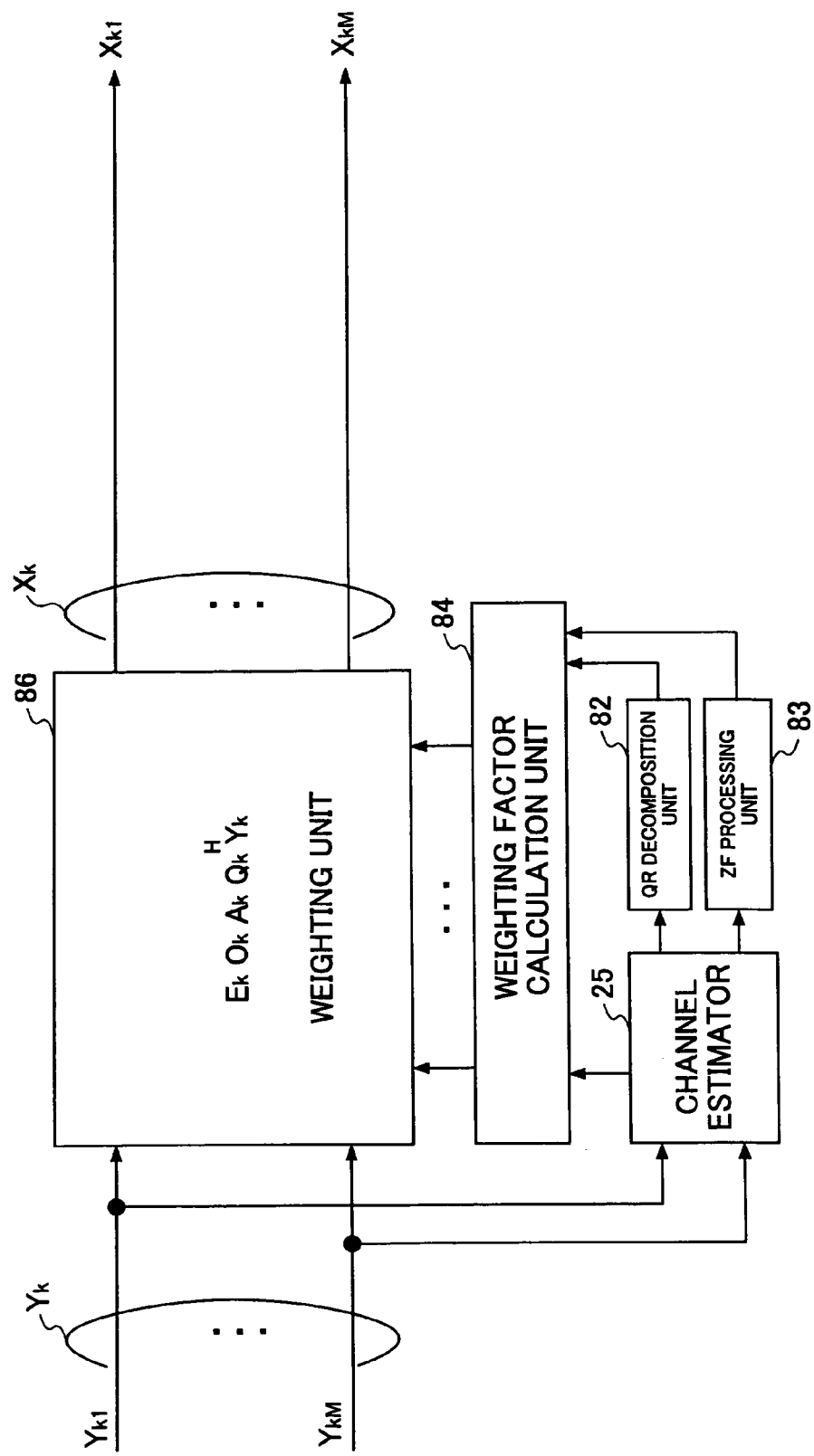
FIG. 8 is a functional block diagram of a relaying signal generator according to still another embodiment of the invention.

FIG. 8 is a functional block diagram of still another example of the relaying signal generator 26 shown in FIG. 2. The relaying signal generator 26 includes a QR decomposition unit 82, a zero-forcing (ZF) processing unit 83, a weighing factor calculation unit 84, and a weighting unit 86.

The QR decomposition unit 82 receives information about the channel matrix $H_k$ (which is a channel matrix between the source node 12 and the k-th relay node 14-$k$) from the channel estimator 25, and breaks down the channel matrix $H_k$ into the form of a product of a unitary matrix $Q_k$ and a triangular matrix $R_k$, which is expressed as $$H_k = Q_k R_k. \quad (41)$$

It should be noted that the first through (i−1)th line elements of the i-th line in the triangular matrix $R_k$ are zero ($2 \leq i \leq M$), as expressed by Equation (42).

$$R_k = \begin{pmatrix} r_{11} & \cdots & r_{1M} \\ & \ddots & \\ 0 & & r_{MM} \end{pmatrix} \quad (42)$$

The ZF processing unit 83 receives information about the channel matrix $G_k$ (which is a channel matrix between the k-th relay node 14-$k$ and the destination node 16) from the channel estimator 25, and estimates a Moore-Penrose inverse matrix $F_k$ of the channel matrix $G_k$ through zero-forcing processing. The Moore-Penrose inverse matrix is expressed as $$F_k = G_k^H (G_k G_k^H)^{-1}. \quad (43)$$

The weighting factor calculation unit 84 calculates a weighting factor to be given to the received signal $Y_k$ based on the information about the matrices $H_k$, $G_k$, and $R_k$.

The weighting unit 86 performs a prescribed matrix operation to convert the received signal $Y_k$ to a relaying signal $X_k$.

Figure 9:
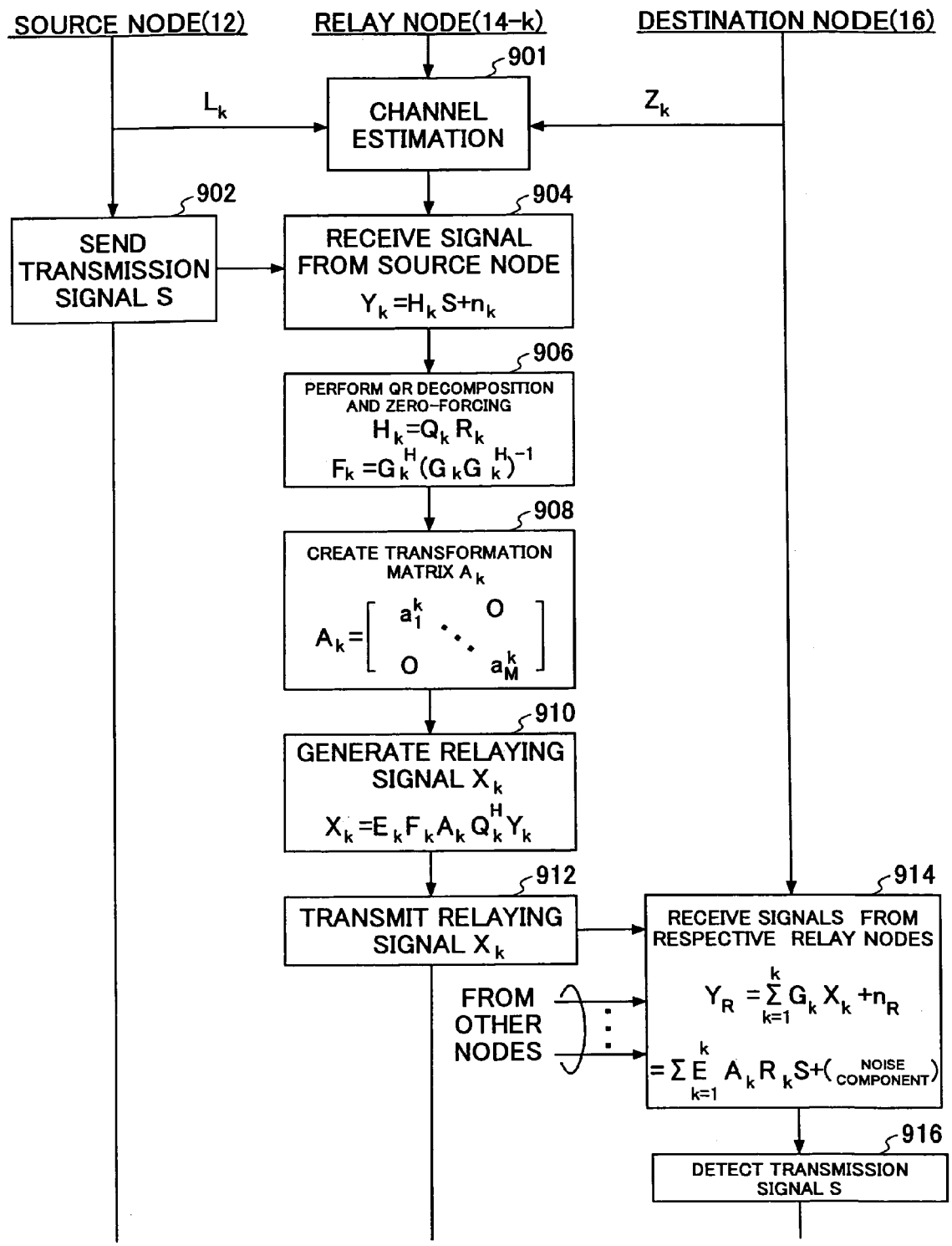
FIG. 9 is a flowchart illustrating operations of the communication system using the relaying signal generator shown in FIG. 8.

FIG. 9 is a flowchart showing the operations of the communication system according to the fourth embodiment of the invention. In this communication system, the source node 12 transmits a transmission signal vector S consisting of a set of M signal components from the M antennas to surrounding relay nodes. The relay nodes located within a prescribed range from the source node 12 receive the signal S. This range may be called a 1-hop range. For convenience of explanation, it is assumed that K relay nodes receive the transmission signal S and perform similar signal processing to relay the signal to the destination node. Although only the k-th relay node ($1 \leq k \leq K$) is illustrated in FIG. 9, the other relay nodes perform similar operations.

First, the source node 12 and the destination node 16 transmit pilot signals $L_k$ and $Z_k$, respectively, which pilot signals are received at the relay node 14-$k$. In step 901, the relay node 14-$k$ performs channel estimation based on the pilot signals $L_k$ and $Z_k$ to estimate a channel matrix H between the source node 12 and the relay node 14-$k$ and a channel matrix G between the relay node 14-$k$ and the destination node 16.

In step 902, the source node 12 transmits a transmission signal represented as a signal vector S consisting of a set of M components from M antennas to surrounding relay nodes.

In step 904, the relay node 14-$k$ receives the signal from the source node 12. The received signal is expressed as $$Y_k = H_k S + n_k \quad (44)$$

where $H_k$ is a channel matrix between the source node 12 and the relay node k-th, as is described above, and $n_k$ denotes the noise component.

In step 906, QR decomposition is performed with respect to the channel matrix $H_k$ at the QR decomposition unit 82 (see FIG. 8). Consequently, the channel matrix $H_k$ is broken down into the form of a product of a unitary matrix $Q_k$ and a triangular matrix $R_k$ ($H_k = Q_k R_k$). In this step, a Moore-Penrose inverse matrix $F_k$ is also estimated with respect to the channel matrix $G_k$ at the ZF processing unit 83.

$$F_k = G_k^H (G_k G_k^H)^{-1} \quad (45)$$

In step 908, a transformation matrix $A_k$ is calculated based on the triangular matrix $R_k$. The transformation matrix $A_k$ is a diagonal matrix as represented in Equations (46) and (47), and non-zero elements are derived from the diagonal components of the triangular matrix $R_k$.

$$A_k = \begin{pmatrix} a_1^k & & 0 \\ & \ddots & \\ 0 & & a_M^k \end{pmatrix} \quad (46)$$

$$a_m^k = r_{mm}^* \quad (47)$$

In Equation (47), $r_{mm}$ is a diagonal element of the triangular matrix $R_k$, and the asterisk indicates a complex conjugate.

In step 910, a relaying signal $X_k$ is calculated. The relaying signal is expressed as $$X_k = E_k F_k A_k Q_k^H Y_k \quad (48)$$

In Equation (48), $E_k$ is a scalar quantity defined as $$E_k = \sqrt{\frac{P}{\frac{P}{M} \mathrm{trace}(F_k A_k R_k R_k^H A_k^H F_k^H) + \mathrm{trace}(F_k F_k^H) \sigma^2}} \quad (49)$$

where P denotes the total transmit power at the source node 12, and $\sigma^2$ denotes a noise level.

In step 912, the relaying signal $X_k$ is transmitted to the destination node 16.

In step 914, the signals from all the relevant relay nodes 14 are received at the destination node 16. The received signal $Y_R$ is expressed as $$Y_R = \sum_{k=1}^{K} G_k X_k + n_R \quad (50)$$

$$= \sum_{k=1}^{K} G_k E_k F_k A_k Q_k^H (H_k S + n_k) + n_R$$

$$= \sum_{k=1}^{K} (E_k A_k R_k S + E_k A_k Q_k^H) + n_R$$

where $n_R$ denotes the noise component.

In step 916, transmission signal S is detected. Since matrices $A_k$ and $R_k$ contained in Equation (50) are a diagonal matrix and a triangular matrix, respectively, the product of these matrices also becomes a triangular matrix. Accordingly, signal detection is performed using a successive interference canceling method (for successively deleting non-diagonal elements).

The dominant elements in the product $A_k R_k$ in Equation (50) are diagonal elements, which elements take positive real numbers. Accordingly, each of the signal components $S_1$ through $S_M$ of the signal vector acquired from the relay nodes are multiplied by real numbers, which resultant signal components are combined at the destination node 16. Because the coefficients used in signal combining do not contain imaginary components (phase components), there is little need to cancel components during the signal combination, and accordingly, in-phase signal combination can be achieved at the maximum ratio. In this embodiment, the destination node 16 can combine relaying signals from the respective relay nodes in phase and coherently. In addition, the diagonal matrix $A_k$ is directly derived from the matrix elements of the triangular matrix $R_k$. Consequently, the workload on the arithmetic operations of this embodiment is substantially the same as that in the conventional method for performing zero-forcing at the relay node.

Embodiment 5

In the fifth embodiment, signal detection is performed at the relay node, as in the second embodiment. The relay node 14 multiplies the received signal $Y_k$ by a unitary matrix $Q^H$ to carry out unitary transformation.

The unitary-transformed received signal $Z_k$ is expressed as $$Z_k = Q_k^H Y_k$$

$$= R_k S + Q_k^H n_k.$$

Since matrix $R_k$ is an upper triangular matrix, the following relation holds if the noise is omitted.

$$Z_{k1} = r_{11}S_1 + r_{12}S_2 + \ldots + r_{1M}S_M$$

$$Z_{k2} = r_{22}S_{12} + \ldots r_{2M}S_M$$

...

$$Z_{kM-1} = r_{M-1\,M-1}S_{M-1} + r_{M-1\,M}S_M$$

$$Z_{kM} = r_{MM}S_M$$

Transmission signal S is detected from the unitary-transformed received signal $Z_k$. First, focusing on the M-th received signal component $Z_{kM}$, transmission signal component $S_M$ is detected based on known $z_{kM}$ and $r_{MM}$. Then, focusing on the (M−1)th received signal component $Z_{kM-1}$, transmission signal component $S_{M-1}$ is detected based on known $r_{M-1\,M-1}$, $r_{MM}$, and $S_M$. In a similar manner, the transmission signal components are successively detected.

In this embodiment, the detected signals $S_1, \ldots, S_M$ are transmitted to the destination node 16 as they are, unlike the second embodiment in which further transformation is performed on the detected signals using a transformation matrix $A_k = \mathrm{diag}(P_k^H)$.

The signal received at the destination node 16 is expressed as $$Y_R = \sum_{n=1}^{N}(G_n)S + n_R \quad (54)$$

where $n_R$ denotes the noise component. The channel matrix $G_k$ is broken down in the form of $\Sigma G_k = OP$, where O is a unitary matrix and P is a triangular matrix. By making use of this relation, Equation (54) can be rewritten in Equation (55).

$$O^H Y_R = O^H\left(\sum_{k=1}^{K} G_k S + n_R\right) \quad (55)$$

$$= PS + n$$

Because P is a triangular matrix, each signal component can be detected at the destination node using a successive type signal detection method, which is explained above.

With this embodiment, the signal processing can be simplified at the relay node 14 because step 712 shown in FIG. 6 can be omitted. However, it should be noted that unitary transformation ($O^H Y_R$) has to be performed on the received signal at the destination node.

Embodiment 6

FIG. 10A is a functional block diagram of a relay signal generator according to the sixth embodiment of the invention. The structure can be applied to the relay signal generator 26 shown in FIG. 2. The relay signal generator includes a QR decomposition unit 82, a ZF processing unit 83, a weighting factor calculation unit 84, and a weighting unit 86. The functions of these components are the same as those shown in FIG. 8; however, the arithmetic operations to be performed are different.

The QR decomposition unit 82 receives information about the channel matrix $G_k$ (between the k-th relay node and the destination node) from the channel estimator 25. It should be noted that in the fourth embodiment the channel matrix $H_k$ is supplied to the QR decomposition unit. The QR decomposition unit 82 performs QR decomposition to break down the channel matrix $G_k$ in the form of product of a unitary matrix $O_k$ and a triangular matrix $P_k$.

$$G_k = P_k^H O_k^H.$$

The ZF processing unit 83 receives information about the channel matrix $H_k$ (between the k-th relay node and the source node) from the channel estimator 25. It should be noted that in the fourth embodiment the channel matrix $G_k$ is supplied to the ZF processing unit. The ZF processing unit 83 performs zero-forcing to produce a Moore-Penrose inverse matrix of the channel matrix $H_k$.

$$J_k = (H_k^H H_k)^{-1} H_k^H.$$

The weighting factor calculation unit 84 estimates a weighting factor to be given to the received signal $Y_k$ based on information about the matrices $H_k$, $G_k$, and $P_k$. The details of the weighting factor are described below in conjunction with the operation.

The weighting unit 86 performs a prescribed matrix operation to convert the received signal $Y_k$ to a relaying signal $X_k$.

Figure 10B:
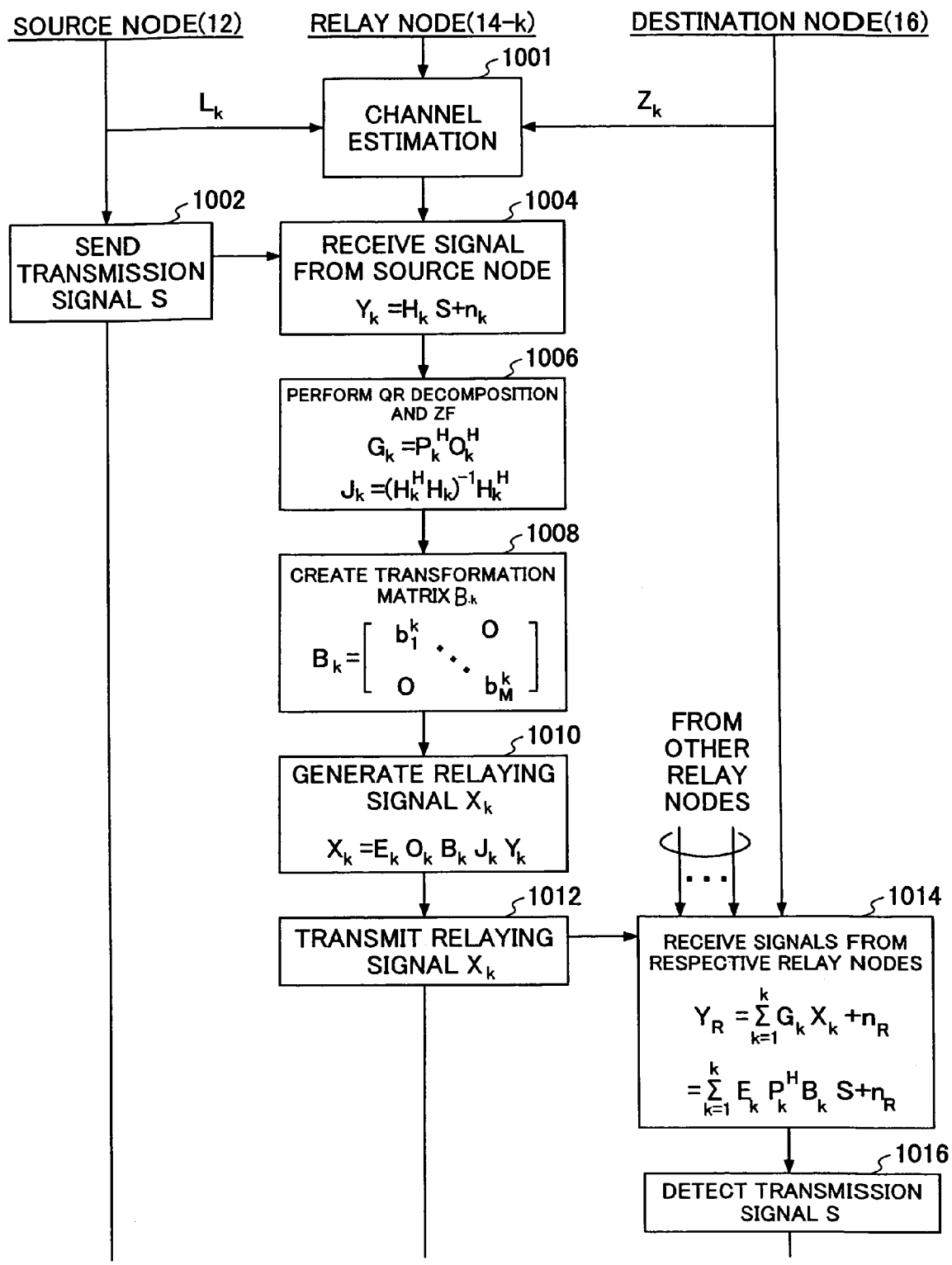
FIG. 10B is a flowchart illustrating operations of the communication system using the relay signal generator shown in FIG. 10A.

FIG. 10B is a flowchart showing the operations according to the sixth embodiment. As in the operation flow shown in FIG. 9, the source node 12 and the destination node 16 transmit pilot signals $L_k$ and $Z_k$, respectively. In step 1001, the relay node 14-k performs channel estimation based on the received pilot signals $L_k$ and $Z_k$, and estimates a channel matrix $H_k$ between the source node 12 and the relay node 14-k and a channel matrix $G_k$ between the relay node 14-k and the destination node 16.

In step 1002, the source node 12 transmits a transmission signal vector S consisting of a set of M signal components from M antennas to surrounding relay nodes.

In step 1004, the signal from the source node 12 is received at a relay node (14-k, for example). The received signal is expressed as $$Y_k = H_k S + n_k,$$

where Hk is a channel matrix between the source node 12 and the k-th relay node, and $n_k$ represents a noise component.

In step 1006, QR decomposition is performed on the channel matrix $G_k$ to break down $G_k$ in the form of a product of a unitary matrix $O_k$ and a triangular matrix $P_k$ ($G_k = P_k^H O_k^H$). The ZF processing unit 83 estimates a Mooro-Penrose inverse matrix $J_k$ for the channel matrix $H_k$ in this step.

$$J_k = (H_k^H H_k)^{-1} H_k^H.$$

In step 1008, a transformation matrix $B_k$ is estimated. The transformation matrix $B_k$ is a diagonal matrix, and its non-zero elements are derived from the diagonal elements of the triangular matrix $P_k$. In step S1010, a relaying signal $X_k$ is estimated based on $$X_k = E_k O_k B_k J_k Y_k,$$

where $E_k$ is a scalar quantity expressed by Equation (49).

In step 1012, the relaying signal $X_k$ is transmitted to the destination node 16.

In step 1014, all the relaying signals from the associated relay nodes are received at the destination node 16. The received signal $Y_R$ is expressed as $$Y_R = \Sigma E_k P_k^H B_k S + n_R,$$

where $n_R$ is a noise component.

In step 1016, the transmission signal S is detected. Because the matrix $B_k$ contained in the received signal YR is a diagonal matrix, and because Pk is a triangular matrix, the product of these matrices is also a triangular matrix. Accordingly, signal detection is carried out using a successive interference canceling method (for successively canceling non-diagonal elements).

The dominant matrix elements in the matrices Pk and Bk are diagonal elements, and such elements are positive real numbers. Accordingly, each of the signal components $S_1$ through $S_M$ of the signal vector acquired from the relay nodes are multiplied by real numbers, which resultant signal components are combined at the destination node 16. Because the coefficients used in signal combining do not contain imaginary components (phase components), there is little need to cancel components during the signal combination, and accordingly, in-phase signal combination can be achieved at the maximum ratio. In this embodiment, the destination node 16 can combine relaying signals from the respective relay nodes in phase and coherently. In addition, the diagonal matrix $B_k$ is directly derived from the matrix elements of the triangular matrix $R_k$. Consequently, the workload on the arithmetic operations of this embodiment is substantially the same as that in the conventional method for performing zero-forcing at the relay node.

Embodiment 7

In the seventh embodiment, the methods described in the first, the fourth, and the sixth embodiments are modified in an adaptive manner. The modification may be selected according to the quality of he channel condition.

For instance, the relay node 14 estimates a channel condition $SNR_H$ between the source node 12 and the relay node 14, and a channel condition $SNR_G$ between the relay node 14 and the destination node 16.

If $SNR_H \gg SNR_G$, the channel matrix H and other matrices derived from the channel matrix H can be estimated with high precision because the channel condition between the source node 12 and the relay node 14 is very good. Accordingly, even if zero-forcing is implemented at the relay node 14, the noise enhancement at the relay nodes is not significant. In this case, it is preferable to carry out the method described in the sixth embodiment.

On the contrary, if $SNR_H \ll SNR_G$, then the channel matrix G and other matrices derived from the channel matrix G can be estimated with high precision because the channel condition between the relay node 14 and the destination node 16 is very good. Accordingly, even if zero-forcing is implemented at the destination node 16, the noise enhancement at the destination node is not significant. In this case, it is preferable to select the method described in the fourth embodiment. In cases other than the above-described two cases, the method of the first embodiment may be employed.

By generating a relaying signal using a unitary matrix and a transformation matrix, signal loss and signal degradation can be prevented during multihop transmission.

In an example, the transformation matrix is calculated based on a product of the first unitary matrix, a commutative matrix, and a conjugate transposed matrix of the second unitary matrix. With this arrangement, multiple relaying signals from multiple relay nodes can be combined in phase at the destination node.

By detecting a transmission signal at the relay node, nose accumulation at every hop can be prevented. In this case, unitary transformation is not required at the destination node, and accordingly, the workload of the signal processing at the destination node can be reduced.

Although in the embodiments channel matrix is broken down into a unitary matrix Q and a triangular matrix R by QR decomposition, the invention is not limited this example, and other transformation that can increase the channel capacity may be used. For example, the inventors found that even if R is not a complete triangular matrix, that is, even if the zero component of the upper triangular matrix or the lower triangular matrix is not completely zero, there is a matrix R existing that can increase the channel capacity, as compared with the complete zero case. The methods listed in the table of FIG. 11 may be used either independently or in combination.

This patent application is based on and claims the benefit of the earlier filing dates of Japanese Patent Applications No. 2004-252879 filed Aug. 31, 2004, No. 2004-306171 filed Oct. 20, 2004, and No. 2005-248824, filed Aug. 30, 2005, the entire contents of which are hereby incorporated by reference.

What is claimed is:

1. A wireless communication system for delivering a transmission signal from a source node via a plurality of relay nodes toward a destination node,
    wherein each of the relay nodes comprises:
        a QR decomposition unit configured to perform QR decomposition on a first channel matrix between the source node and the relay node and/or a second channel matrix between the relay node and the destination node;
        a transformation matrix calculation unit configured to calculate one or more transformation matrices based on the QR of at least one of the first and second channel matrices;
        a relaying signal generator configured to generate a relaying signal by multiplying a received signal by a prescribed signal comprised of at least one of the transformation matrices; and
        a transmission unit configured to transmit the relaying signal to the destination node; and
    wherein the destination node receives the relaying signal as a received signal and detects a desired signal from the received signal.

2. The wireless communication system of claim 1, wherein the destination node detects the desired signal from the received signal using a successive interference canceling method.

3. The wireless communication system of claim 1, further comprising:
    a feedback channel from the destination node via the relay nodes to the source node;
    wherein the destination node estimates values including a data rate and a power level of the transmission signal on the basis of a channel estimation value, and feeds back the values to the source node via the feed back channel.

4. The wireless communication system of claim 1, wherein each of the relay nodes further comprises:
    a signal detection unit configured to detect the transmission signal on the basis of a signal received from the source node and the first channel matrix representing the channel between the source node and the relay node;
    wherein the relaying signal generator generates the relaying signal by multiplying the detected signal by said at least one of the transformation matrix and a unitary matrix derived from the second channel matrix.

5. A communication node that relays signals between a source node and a destination node, comprising:

a first unitary matrix calculation unit configured to calculate a first unitary matrix based on a first channel between the source node and the communication node;

a second unitary matrix calculation unit configured to calculate a second unitary matrix based on a second channel between the communication node and the destination node;

a transformation matrix estimation unit configured to estimate a transformation matrix on the basis of a triangular matrix derived from QR decomposition of the first and/or the second channel matrix;

a relaying signal generator configured to generates a relaying signal by multiplying a received signal by at least one of the first unitary matrix, the second unitary matrix, and the transformation matrix; and a transmission unit configured to transmit the relaying signal to the destination node.

6. The communication node of claim 5, further comprising:

a signal detector configured to detect a transmission signal transmitted from the source node, based on the received signal, using the first unitary matrix;

wherein the relaying signal generator generates the relaying signal by multiplying the detected transmission signal by at least one of the transformation matrix and the second unitary matrix.

7. The communication node of claim 5, wherein the first unitary matrix calculation unit calculates the first unitary matrix by breaking down the first channel matrix into the form of a product containing a first triangular matrix, and the second unitary matrix calculation unit calculates the second unitary matrix by breaking down the second channel matrix into the form of a product containing a second triangular matrix.

8. The communication node of claim 5, wherein a matrix element in the i-th line and the j-th column of the transformation matrix is zero if i+j is not a prescribed value.

9. A communication node that relays signals between a source node and a destination node, comprising:

a first matrix calculation unit configured to calculate a unitary matrix based on one of a first channel matrix between the destination node and the communication node;

a second matrix calculation unit configured to calculate a Moore-Penrose inverse matrix based on a second channel matrix between the source node and the communication node;

a transformation matrix calculation unit configured to calculate a transformation matrix on the basis of a triangular matrix derived from QR decomposition of the second matrix;

a relaying signal generator configured to generate a relaying signal by multiplying a received signal by the unitary matrix, Moore-Penrose inverse matrix, and the transformation matrix; and a transmission unit configured to transmit the relaying signal.

10. A communication node that relays signals between a source node and a destination node, comprising:

a first matrix calculation unit configured to calculate a unitary matrix based on one of a first channel matrix between the source node and the communication node;

a second matrix calculation unit configured to calculate a Moore-Penrose inverse matrix based on a second channel matrix between the destination node and the communication node;

a transformation matrix calculation unit configured to calculate a transformation matrix based on a triangular matrix derived from QR decomposition of the second matrix;

a relaying signal generator configured to generate a relaying signal by multiplying a received signal by the unitary matrix, Moore-Penrose inverse matrix, and the transformation matrix; and a transmission unit configured to transmit the relaying signal.

11. The communication node of claim 9 or 10, wherein the communication node feeds information about a rate and a transmit power of the transmission signal measured at the destination node back to the source node.

12. A communication method for relaying a transmission signal transmitted from a source node via a plurality of relay nodes to a destination node, the method comprising the steps of:

performing a QR decomposition on a first channel matrix between the source node and a relay node or a second channel matrix between the relay node and the destination node;

calculating one or more transformation matrices based on the QR decomposition of at least one of the first and second channel matrices;

generating a relaying signal by multiplying a prescribed signal by at least one of the transformation matrices;

transmitting the relaying signal from the relay node to the destination node; and receiving the relaying signal and detecting a desired signal from the received signal at the destination node.

13. A communication method for relaying a transmission signal transmitted from a source node via a relay node to a destination node, comprising the steps of:

estimating a first unitary matrix based on a first channel matrix between the source node and the relay node;

estimating a second unitary matrix based on a second channel matrix between the relay node and the destination node;

estimating a transformation matrix based on a triangular matrix derived from QR decomposition of the first and/or second channel matrix;

generating a relaying signal by multiplying a received signal by at least one of the first unitary matrix, the second unitary matrix, and the transformation matrix;

transmitting the relaying signal from the relay node to the destination node; and receiving the relaying signal and detecting a desired signal from the received signal at the destination node.

14. A communication method for relaying a transmission signal transmitted from a source node via a relay node to a destination node, comprising the steps of:

calculating a unitary matrix and a Moore-Penrose inverse matrix based on channel matrices of wireless transmission channels;

calculating a transformation matrix on the basis of a triangular matrix derived from QR decomposition of at least one of the channel matrices;

generating a relaying signal by multiplying a received signal by the unitary matrix, the Moore-Penrose inverse matrix, and the transformation matrix;

transmitting the relaying signal from the relay node to the destination node; and receiving the relaying signal and detecting a desired signal from the received signal at the destination node.

15. A communication node for relaying a signal between a source node and a destination node, comprising:
- a relaying signal generator configured to generate a relaying signal based on a received signal; and
- a transmission unit configured to transmit the relaying signal to the destination node,
- wherein the relaying signal generator adaptively selects one of first through third signal generation modes,
- in the first mode, the signal generator calculates a first unitary matrix based on a first channel matrix between the source node and a relay node, a second unitary matrix based on a second channel matrix between the destination node and the relay node, and a transformation matrix based on the triangular matrix derived from QR decomposition of the first and/or the second matrix to generate the relaying signal by multiplying the received signal by at least one of the first unitary matrix, the second unitary matrix, and the transformation matrix;
- in the second mode, the signal generator calculates a Moore-Penrose inverse matrix based on the first channel matrix between the source node and the relay node, a unitary matrix based on the second channel matrix between the destination node and the relay node, and a transformation matrix based on the triangular matrix derived from QR decomposition of the first and/or the second channel matrix to generate the relaying signal by multiplying the unitary matrix, the Moore-Penrose inverse matrix and the transformation matrix; and
- in the third mode, the signal generator calculates a unitary matrix based on the first channel matrix between the source node and the relay node, a Moore-Penrose inverse matrix based on the second channel matrix between the destination node and the relay node, and a transformation matrix based on the triangular matrix derived from QR decomposition of the first and/or the second channel matrix to generate the relaying signal by multiplying the unitary matrix, the Moore-Penrose inverse matrix and the transformation matrix.

* * * * *